US009093070B2

(12) United States Patent
Kim

(10) Patent No.: US 9,093,070 B2
(45) Date of Patent: Jul. 28, 2015

(54) METHOD AND MOBILE DEVICE FOR EXECUTING A PRESET CONTROL COMMAND BASED ON A RECOGNIZED SOUND AND ITS INPUT DIRECTION

(75) Inventor: Yongsin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 296 days.

(21) Appl. No.: 13/544,787

(22) Filed: Jul. 9, 2012

(65) Prior Publication Data

US 2013/0297319 A1    Nov. 7, 2013

(30) Foreign Application Priority Data

May 1, 2012    (KR) .................. 10-2012-0045922

(51) Int. Cl.
*G10L 15/22*    (2006.01)

(52) U.S. Cl.
CPC ........... *G10L 15/22* (2013.01); *G10L 2015/223* (2013.01); *G10L 2015/227* (2013.01)

(58) Field of Classification Search
CPC .................. G10L 202/021661; G10L 15/02
USPC ................................. 704/275–277
See application file for complete search history.

(56) References Cited

U.S. PATENT DOCUMENTS

| | | | | |
|---|---|---|---|---|
| 5,884,254 A * | 3/1999 | Ucar | | 704/231 |
| 6,219,645 B1 * | 4/2001 | Byers | | 704/275 |
| 6,408,272 B1 * | 6/2002 | White et al. | | 704/270.1 |
| 7,139,716 B1 * | 11/2006 | Gaziz | | 704/275 |
| 7,505,901 B2 * | 3/2009 | Kaltenmeier et al. | | 704/231 |
| 7,684,983 B2 * | 3/2010 | Shikano et al. | | 704/233 |
| 8,078,469 B2 * | 12/2011 | White et al. | | 704/270.1 |
| 8,376,803 B2 * | 2/2013 | Oonaka | | 446/175 |
| 2008/0101624 A1 | 5/2008 | Schentrup et al. | | |
| 2010/0123785 A1 | 5/2010 | Chen et al. | | |
| 2011/0164141 A1 | 7/2011 | Tico et al. | | |
| 2011/0275434 A1 | 11/2011 | Cheng et al. | | |

* cited by examiner

*Primary Examiner* — Michael N Opsasnick
(74) *Attorney, Agent, or Firm* — Birch, Stewart, Kolasch & Birch, LLP

(57) ABSTRACT

A mobile device having at least one microphone sensor and a method for controlling the same are disclosed. The method includes receiving at least two audio signals through the at least one microphone sensor within a predetermined time period, recognizing input directions and voice command from the at least two audio signals sequentially, determining whether the recognized input directions and voice command match to preset input directions and preset voice command mapped to the preset directions, sequentially for the at least two received audio signals, and executing a preset control command, if the recognized input directions and voice command match to the preset input directions and voice command.

18 Claims, 22 Drawing Sheets

FIG. 4

| direction | voice command |
|-----------|---------------|
| 000 | play |
| 001 | delete |
| 010 | stop |
| 011 | copy |
| ⋮ | ⋮ |

| direction | voice command | control command |
|---|---|---|
| 000 | 2 | unlock mobile |
| 011 | 8 | |
| 010 | 4 | |
| 101 | 2 | |
| 111 | 7 | run app |
| 100 | 4 | |
| ⋮ | ⋮ | ⋮ |

610  620  630

FIG. 12
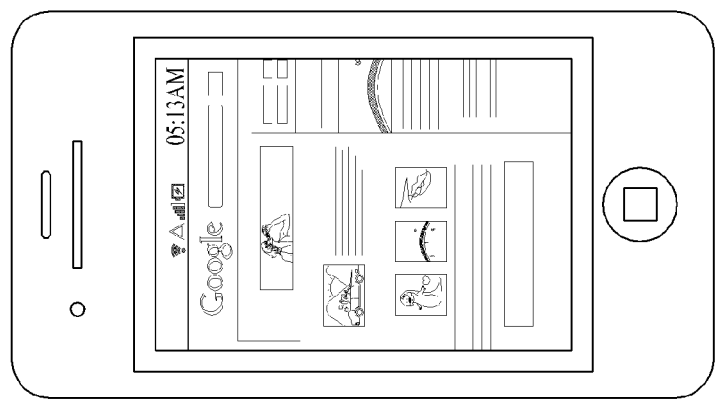
(b)
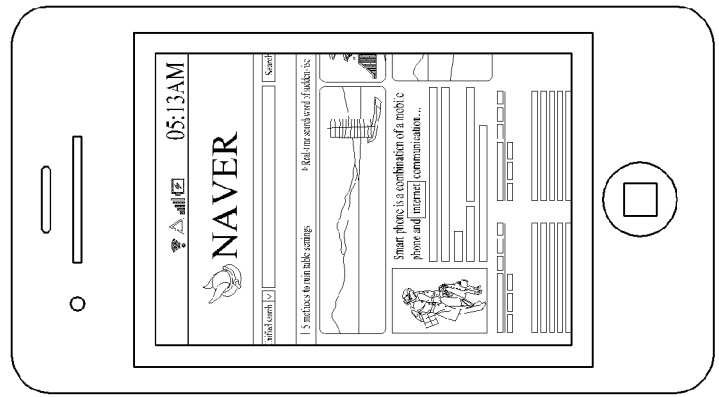
(a)

FIG. 16
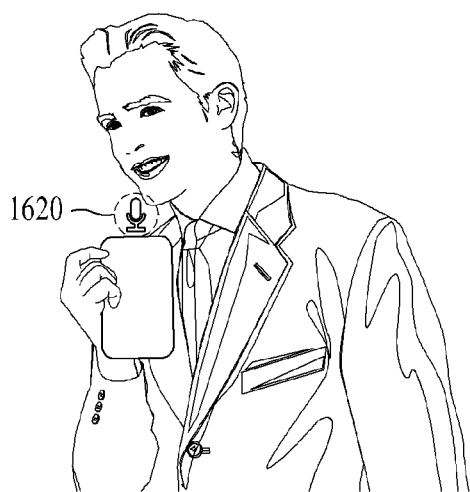

METHOD AND MOBILE DEVICE FOR EXECUTING A PRESET CONTROL COMMAND BASED ON A RECOGNIZED SOUND AND ITS INPUT DIRECTION

This application claims the benefit of Korean Patent Application No. 10-2012-0045922, filed on May 1, 2012, which is hereby incorporated by reference as if fully set forth herein.

BACKGROUND OF THE INVENTION

1. Field of the Invention

The present invention relates to a mobile device having at least one microphone sensor and a method for controlling the same, and more particularly, to a mobile device having at least one microphone sensor, for operating differently according to the input direction of an audio signal and voice command contained in the audio signal, which are recognized in the mobile device, and a method for controlling the same. The mobile device refers to a portable wireless communication terminal that can be provided with a built-in microphone sensor and can wirelessly transmit and receive voice, text, and video data, such as a mobile communication terminal, a Personal Communication Service (PCS) terminal, a Personal Digital Assistant (PDA), a smart phone, a Wireless Local Area Network (WLAN) terminal, etc.

2. Discussion of the Related Art

A microphone or mike installed in a mobile device is generally an acoustic-to-electrical transducer that converts sound into an electrical signal. Microphones are classified largely into dynamic microphones and condenser microphones according to their operation principles and structures. Besides, microphones are categorized into piezoelectric microphones relying on piezoelectricity, carbon microphones using the contract resistance of carbon granules, omnidirectional pressure microphones that generate output proportional to sound pressure, and bi-directional velocity microphones whose output is proportional to the velocity of the air particles forming a sound wave.

Most of conventional mobile devices equipped with such microphones receive sound through a single microphone. When sound is received through a single microphone, a user should be cautious about the position of the microphone during speaking. Especially in a voice recognition system that keeps a high Signal to Noise Ratio (SNR), the user should speak near to the microphone. Accordingly, the use of the single microphone is not practical, causing user inconvenience.

Voice recognition-enabled mobile devices have been realized. Voice recognition finds its use in wide applications ranging from phone number search, dialing, menu name recognition, speech-to-text message input, music selection, function control during audio play, etc. in the mobile devices.

However, as mobile devices have more and more functions owing to the emergence of smart phones, there are lots of means for executing the same command and thus the functions cannot be fully utilized with a simple voice recognition function. For example, in case of search, users may prefer different search engines. In case of controlling peripheral device through communication to them, users may want connection to different peripheral devices.

SUMMARY OF THE INVENTION

Accordingly, the present invention is directed to a mobile device having at least one microphone sensor and a method for controlling the same that substantially obviate one or more problems due to limitations and disadvantages of the related art.

An object of the present invention is to provide a mobile device for operating according to the input direction of a sound source and voice command contained in the sound source, recognized through at least one microphone sensor and a method for controlling the same.

Another object of the present invention is to provide a mobile device for executing the same recognized voice command differently according to the input direction of the sound source and a method for controlling the same.

A further object of the present invention is to provide a mobile device having one or more microphone sensors at various positions to reduce an error probability and a method for controlling the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a mobile device having at least one microphone sensor includes receiving at least two audio signals in a sequence through the at least one microphone sensor within a predetermined time period, recognizing input directions and voice commands from the at least two audio signals in the sequence, determining whether the recognized input directions and voice commands correspond with preset input directions and preset voice commands mapped to the preset directions, and executing at least one a preset control command, when the recognized input directions and voice commands are determined to correspond with the preset input directions and voice commands.

In another aspect of the present invention, a method for controlling a mobile device having at least one microphone sensor includes receiving audio signals through the at least one microphone sensor, selecting an audio signal among the received audio signals, recognizing an input direction and voice command of the selected audio signal, identifying an object displayed in the recognized input direction of the selected audio signal, and executing at least one control command based on the recognized voice command of the selected audio signal for the identified object.

In a further aspect of the present invention, a mobile device having at least one microphone sensor includes a microphone unit for receiving an audio signal through the at least one microphone sensor, and a controller for recognizing an input direction and voice command of the received audio signal and controlling the mobile device to execute a preset control command corresponding to the recognized input direction and voice command.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a table listing direction-voice mapping information for use in the mobile device according to an embodiment of the present invention;

FIG. 6 is a table listing direction-voice mapping information and control commands corresponding to direction-voice mapping information for use in the mobile device according to an embodiment of the present invention;

FIG. 12 illustrates an operation for displaying different search engine in the mobile device, when the same voice command is uttered from different directions according to an embodiment of the present invention;

FIG. 16 illustrates an operation for executing different functions in the mobile device, when voice command is recognized from different directions according to an embodiment of the present invention;

DETAILED DESCRIPTION OF THE INVENTION

Embodiments of the present invention will be described below in detail with reference to the attached drawings.

The terms "module" and "unit" used to signify components are used herein to help the understanding of the components and thus they should not be considered as having specific meanings or roles. Accordingly, the terms "module" and "unit" may be used interchangeably.

A mobile device described herein may have a built-in microphone sensor, like a portable communication device, a portable computer, or a portable terminal. In general, the mobile device may include a display screen, a touchpad, or a small keyboard to provide a user-friendly interface.

The embodiments of the present invention will be described in detail with reference to the attached drawings and a description in the attached drawings, which should not be construed as limiting the present invention.

In addition, although the terms used in the present invention are selected from generally known and used terms, the terms may be changed according to the intention of an operator, customs, or the advent of new technology. Some of the terms mentioned in the description of the present invention have been selected by the applicant at his or her discretion, the detailed meanings of which are described in relevant parts of the description herein. Therefore, the present invention must be understood, not simply by the actual terms used but by the meanings of each term lying within.

Figure 1:
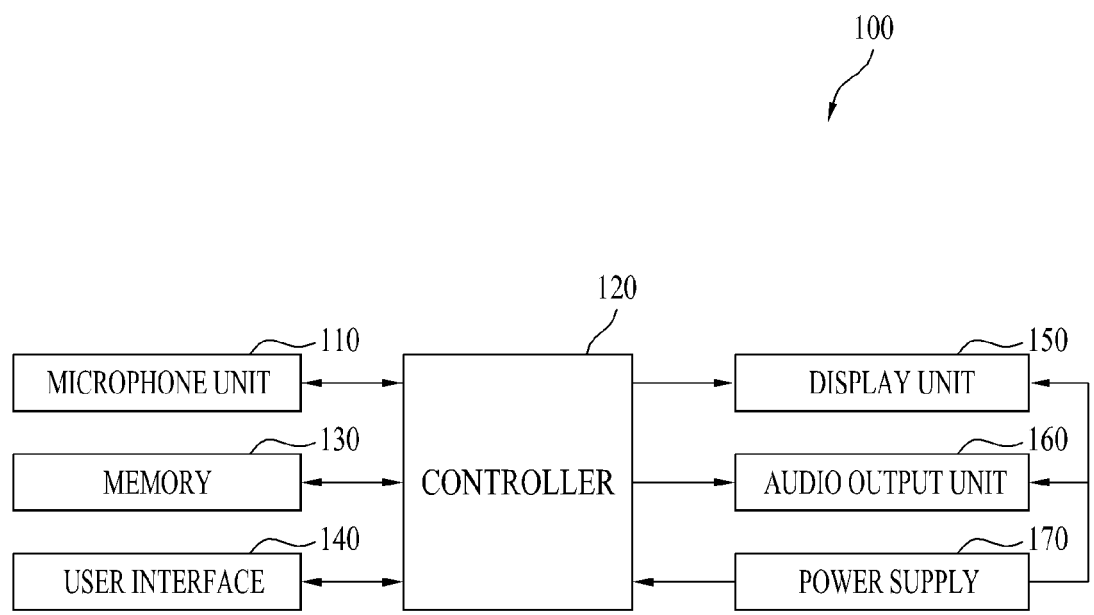
FIG. 1 is a functional block diagram of a mobile device according to an embodiment of the present invention.

FIG. 1 is a functional block diagram of a mobile device according to an embodiment of the present invention. Notably, FIG. 1 illustrates an embodiment set forth to describe the present invention. Deletion or addition of a component module as needed to those skilled in the art falls within the appended claims of the present invention.

Referring to FIG. 1, a mobile device 100 according to an embodiment of the present invention may include a microphone unit 110, a controller 120, a memory 130, a user interface 140, a display unit 150, an audio output unit 160, and a power supply 170.

The microphone unit 110 senses sound around the mobile device 100. The microphone unit 110 may receive an audio signal through one or more microphone sensors. The microphone sensors may be arrayed at a regular or irregular interval. Microphone arrays each having microphone sensors are provided in different directions, for example, at upper, lower, left, and right positions of the mobile device 100, for receiving an audio signal generated from any direction.

Figure 2:
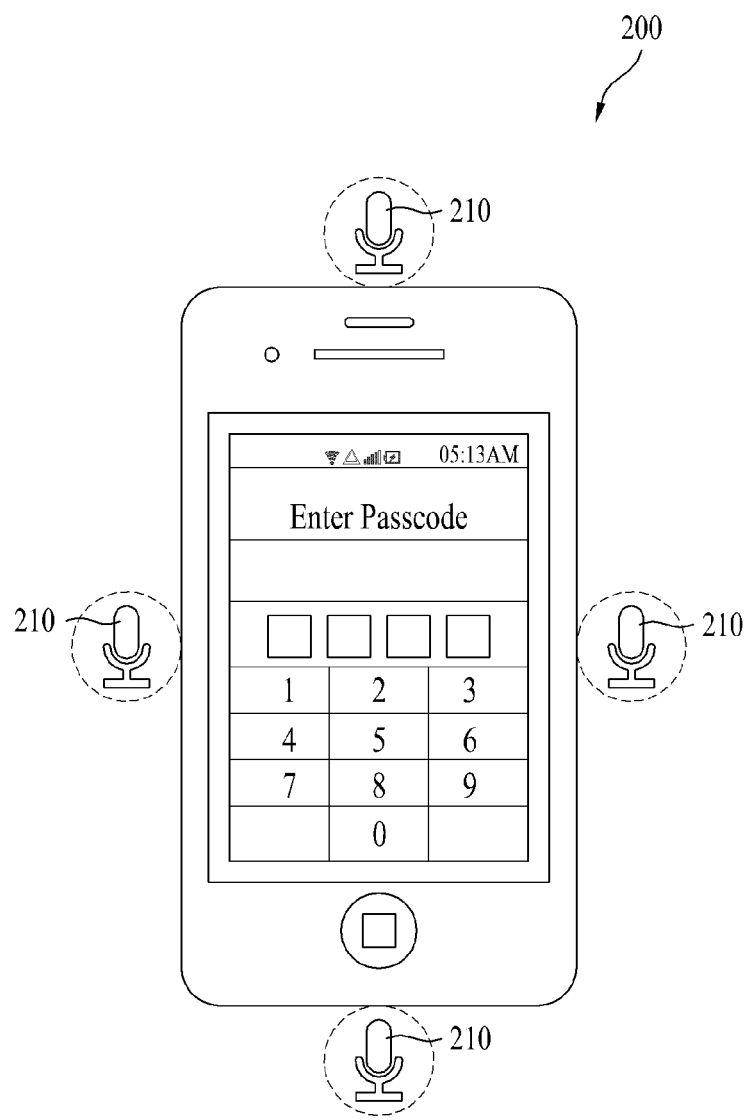
FIG. 2 illustrates a built-in microphone unit in the mobile device according to an embodiment of the present invention.

FIG. 2 illustrates a built-in microphone unit in the mobile device according to an embodiment of the present invention. While microphones 210 are built in in four directions, that is, at upper, lower, left, and right positions of a mobile device 200, the positions of the built-in microphones 210 are not limited to the specific positions.

Figure 3:
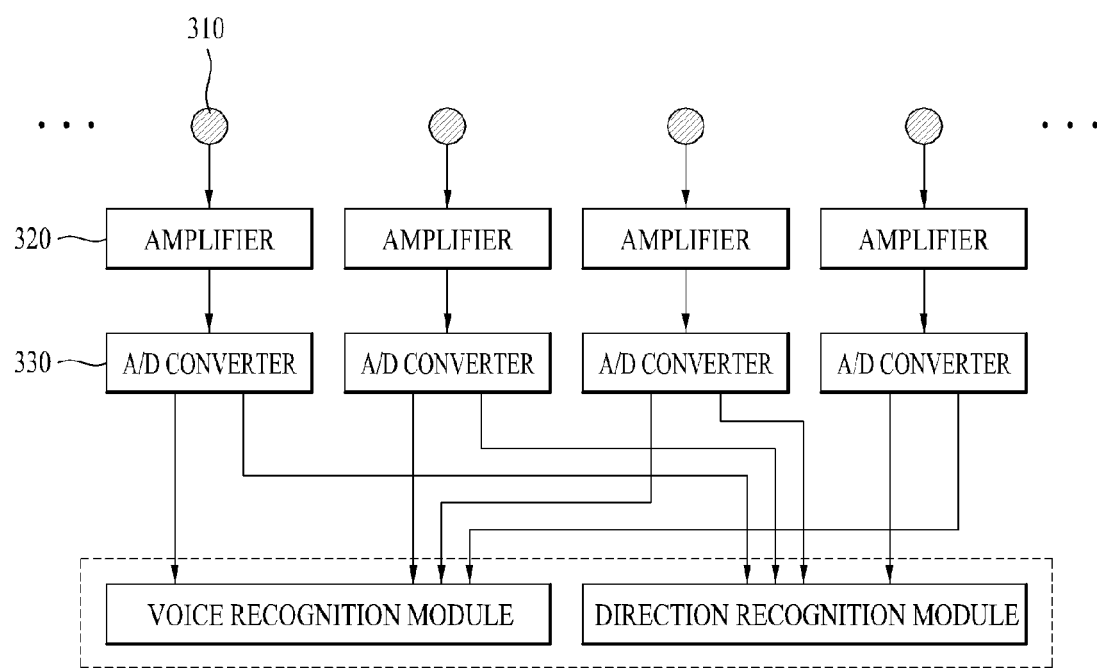
FIG. 3 is a block diagram of the microphone unit in the mobile device according to an embodiment of the present invention.

FIG. 3 is a block diagram of the microphone unit in the mobile device according to an embodiment of the present invention. Referring to FIG. 3, the microphone unit 110 may include amplifiers 320 for amplifying sounds received from a microphone sensor array 310 to a predetermined level, and Analog to Digital (A/D) converters 330 for converting analog audio signals received through the microphones to digital audio signals.

The controller 120 may recognize voice command included in an audio signal and an input direction of the audio signal using a voice recognition module and a direction recognition module that are included in the memory 130 and may control execution of a predetermined control command corresponding to the recognized voice command and input direction of the audio signal.

The voice recognition module is a module that recognizes voice from an audio signal received from the microphone unit 110. The voice recognition module can recognize voice from an audio signal. That is, the voice recognition module can determine voice command (the meaning of the sound) or identify a person that has made the sound. The voice recognition module may be a known one (a known voice recognition engine). When the voice recognition module is activated, the controller 120 may notify a user of activation of the voice recognition module through the display unit 150.

Upon receipt of an audio signal from the microphone unit 110, the controller 120 may control immediate recognition of voice at the voice recognition module or may control the voice recognition module to recognize voice only upon input of a key command from the user.

For example, if the mobile device 100 is a portable phone, the voice recognition function may be activated by pressing a predetermined button or selecting a menu in a menu tree. Thus, the voice recognition function may be activated by pressing the button short, and different functions may be activated by defining short button pressing and long button pressing separately. In the case where voice is recognized only upon user selection such as input of a user key command as described above, the controller 120 may operate and control the voice recognition module only when the voice recognition function is activated by user selection.

The direction recognition module is a module that senses a direction from which an audio signal is received. If the microphone sensors of the microphone unit 110 are directional, the direction recognition module may be included in the microphone unit 110. A directional microphone sensor has a strong response to sound from a specific direction only. Its response gets weaker as sound is farther from the axis of the specific direction. Owing to the feature, the directional microphone sensor can recognize the input direction of an audio signal.

The direction recognition module, which is a module that recognizes a direction from which an audio signal is received, may be programmed to the memory 130 and may be operated under control of the controller 120. The direction recognition module may measure the sound pressures of audio signals received from the microphone unit 110 and may determine a direction in which a microphone sensor receiving an audio signal having a highest sound pressure is positioned to be the input direction of the audio signal.

Sound pressure is a quantity representing a variation in pressure caused by a sound wave, theoretically the intensity of the sound wave. That is, sound pressure is a variation in a fine output generated by the sound wave. Accordingly, it can be determined that a user has spoken from a direction in which a microphone sensor receiving an audio signal with a highest sound pressure is positioned, by comparing received audio signals.

Once the direction recognition module determines the input direction of an audio signal, sound may be made in the determined direction by changing weight factors of microphone sensors, when needed. As the weight factors of the individual microphone sensors are changed electronically, sound can be made in a desired direction even though the mobile device 100 is not moved mechanically.

As described above, the controller 120 recognizes voice command contained in an audio signal and an input direction of the audio signal using the voice recognition module and the direction recognition module and controls the mobile device 100 so as to execute a predetermined control command corresponding to the recognized voice command and input direction. For this purpose, the memory 130 may store direction-voice mapping information being information about mapping between input directions of an audio signal and voice command contained in the audio signal, and control commands corresponding to the direction-voice mapping information in order to control the mobile device 100, which will be described later in detail with reference to FIGS. 4 and 6.

The user interface 140 transmits a user-input signal to the controller 120 or outputs a signal received from the controller 120 to the user. Therefore, the user interface 140 may include input means such as a touchpad, buttons, etc. to receive a signal from the user. The microphone unit 110 may also be incorporated into the user interface 140.

The display unit 150 generates a driving signal by converting a video signal or data signal processed by the controller 150 or received from an external device to a Red, Green, Blue (R.G.B) signal. The display unit 150 may be configured into a Plasma Display Panel (PDP) display, a Liquid Crystal Display (LCD), a flexible display, a three-dimensional (3D) display, etc.

For the input of an audio-processed signal from the controller 120, for example, a stereo signal, 3.1 channel signal, or 5.1 channel signal, the audio output unit 160 outputs voice. Various types of speakers are available to the configuration of the audio output unit 160.

The power supply 170 supplies power to the entire mobile device 100. For example, the power supply 170 may supply power to the controller 120 that can be implemented into a System On Chip (SOC), the display unit 150 for displaying images, and the audio output unit 160 for audio output.

FIG. 4 is a table listing direction-voice mapping information for use in the mobile device according to an embodiment of the present invention. Referring to FIG. 4, input directions 410 of audio signals, recognized in the mobile device and voice command 420 mapped to the input directions 410 may be stored so that if a recognized input direction and voice command match an input direction 410 and voice command 420 mapped to the input direction 410, the controller 120 controls execution of a control command corresponding to the input direction 410 and the voice command 420.

While the voice command 420 itself signifies control commands and thus the control commands are not additionally described in FIG. 4, the control commands corresponding to the direction-voice mapping information may be stored additionally and the voice command 410 may be uttered in various languages, not limited to English. In FIG. 4, the input directions 410 are represented in 3 bits. If only four directions are defined as illustrated in FIG. 2, 2 bits are sufficient for representing the input directions 410.

Figure 5:
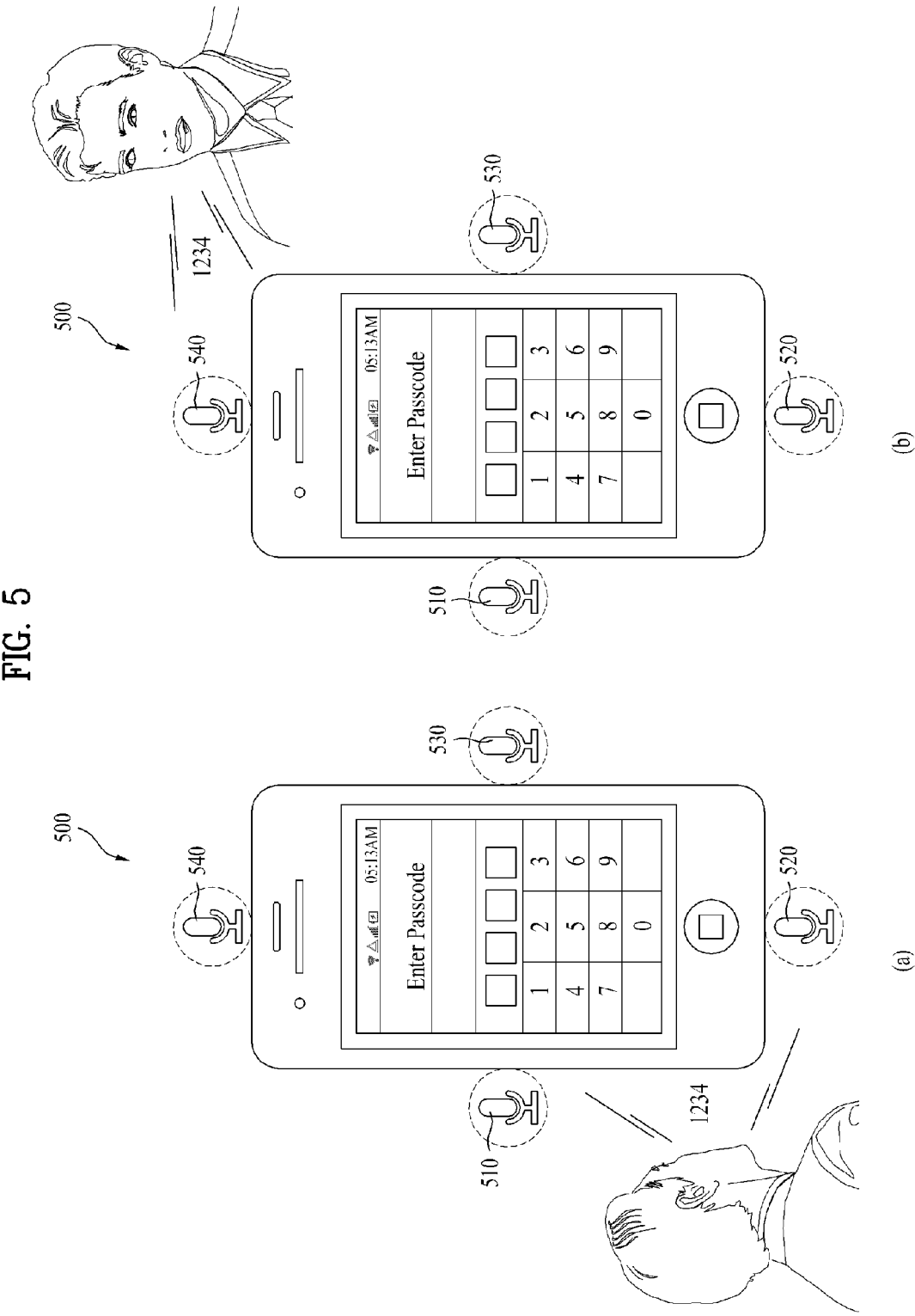
FIG. 5 illustrates an operation of the mobile device based on the input direction of an audio signal and voice command contained in the audio signal according to an embodiment of the present invention.

FIG. 5 illustrates an operation of the mobile device based on the input direction of an audio signal and voice command contained in the audio signal according to an embodiment of the present invention. In the illustrated case of FIG. 5, microphone sensors are installed in four directions, that is, at upper, lower, left and right positions and a spoken word "AAA" is mapped to the right direction with respect to the mobile device.

Referring to FIG. 5(a), when a user speaks "AAA" from the right direction of the mobile device, the direction recognition module determines the direction of a right microphone sensor 510 sensing a highest sound pressure from among upper, lower, left, and right microphone sensors 540, 520, 530 and 510 to be the input direction of an audio signal containing the spoken word "AAA". If the voice recognition module recognizes the spoken word "AAA" from the audio signal, the controller extracts a control command corresponding to the right direction and the voice command "AAA" from the memory. If the extracted control command is a screen unlocking command for the mobile device, the controller may control screen unlocking.

Referring to FIG. 5(b), when the user speaks "AAA" from up the mobile device, the direction recognition module determines the direction of the upper microphone sensor 540 sensing a highest sound pressure from among the upper, lower, left, and right microphone sensors 540, 520, 530 and 510 to be the input direction of an audio signal containing the spoken word "AAA". The voice recognition module also recognizes the spoken word "AAA" from the audio signal. However, the spoken word "AAA" uttered from up the mobile device does not match to the direction-voice mapping information stored in the memory and thus the controller does not perform an operation. In this case, the controller may control output of an audio signal or display of warning information to the user to indicate the direction-voice mismatch.

The use of the direction-voice mapping information in this manner can reinforce security, compared to control of the mobile device based on simple voice recognition.

To further reinforce security, the controller of the mobile device may recognize the voice command and input direction of each of at least two successive audio signals received within a preset time period, sequentially for the at least two audio signals, determine whether the recognized input directions and voice command match to preset direction-voice mapping information, and control execution of a predetermined control command if the recognized input directions and voice command match to the preset direction-voice mapping information.

That is, if an input direction and voice command mapped to the input direction is referred to as direction-voice mapping information, the direction-voice mapping information of the at least two successively received audio signals is sequentially compared with a pre-stored mapping information list. Only when the direction-voice mapping information matches to the mapping information list, a preset control command can be executed. The preset control command may include a screen unlocking command or an application unlocking command.

FIG. 6 is a table listing direction-voice mapping information and control commands corresponding to direction-voice mapping information for use in the mobile device according to an embodiment of the present invention. Referring to FIG. 6, a mapping information list is generated by sequentially storing input directions 610 of audio signals and voice command 620 mapped to the input directions 610. In addition, control commands 630 are stored to control the mobile device according to the sequentially stored mapping information list. Therefore, only when the input directions, voice command, and input order of at least two audio signals received successively within a predetermined time period match to the mapping information list, the controller may control execution of a control command 630.

Since an important function requiring high security such as unlocking is performed based on both an input direction of an audio signal and voice command contained in the audio signal, user convenience and security can be increased.

Figure 7:
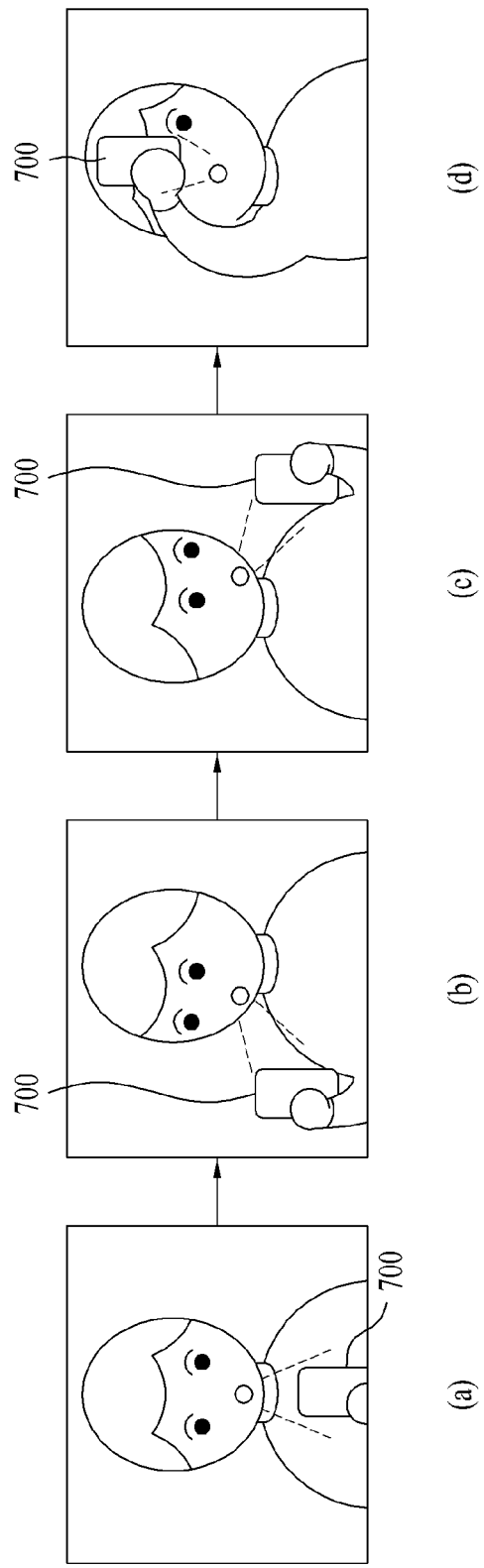
FIGS. 7 and 8 illustrate a screen unlocking operation based on the input direction of an audio signal and voice command contained in the audio signal in the mobile device according to an embodiment of the present invention.
Figure 8:
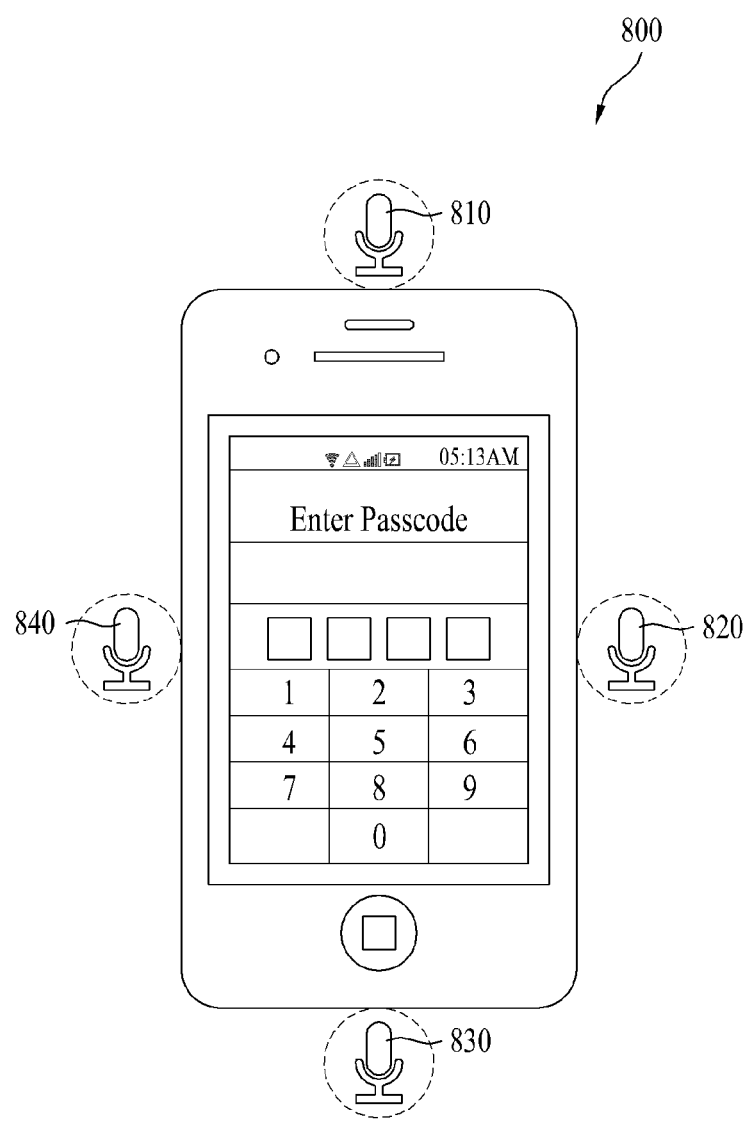

FIGS. 7 and 8 illustrate a screen unlocking operation based on the input direction of an audio signal and voice command contained in the audio signal in the mobile device according to an embodiment of the present invention. Referring to FIG. 7, to unlock a screen which was locked with a 4-digit passcode, a user speaks the passcode toward a mobile device 700 from a different direction for each digit of the passcode.

When the user speaks the first digit of the passcode as illustrated in FIG. 7(a), an upper microphone sensor 810 built at an upper position of a mobile device 800 receives an audio signal having a highest sound pressure and recognizes the voice command uttered by the user, determining that the audio signal has been received from up the mobile device 810 in FIG. 8. When the user speaks the second digit of the passcode successively within a predetermined time as illustrated in FIG. 7(b), a left microphone sensor 820 built at a left position of the mobile device 800 receives an audio signal having a highest sound pressure and recognizes the voice command uttered by the user, determining that the audio signal has been received from the left direction in FIG. 8. When the user speaks the third digit of the passcode successively within the predetermined time as illustrated in FIG. 7(c), a right microphone sensor 840 built at a right position of the mobile device 800 receives an audio signal having a highest sound pressure and recognizes the voice command uttered by the user, determining that the audio signal has been received from the right direction in FIG. 8. When the user speaks the fourth digit of the passcode successively within the predetermined time as illustrated in FIG. 7(d), a lower microphone sensor 830 built at a lower position of the mobile device 800 receives an audio signal having a highest sound pressure and recognizes the voice command uttered by the user, determining that the audio signal has been received from down the mobile device 800 in FIG. 8.

In the absence of any further audio signal received within the predetermined time, the controller compares the order of the recognized input directions and voice command with pre-stored passcode information, that is, a mapping information list. If there is any matching passcode information, the controller controls screen unlocking. However, if only the directions or the voice command matches to the pre-stored passcode information, the controller may control audible or visual notification of the direction-voice mismatch to the user, without unlocking the screen.

While different audio signal directions are set in the mapping information list in FIGS. 7 and 8, the present invention is not limited to the specific case. That is, direction information included in the mapping information list may specify wholly different directions, the same direction, or partially different directions. Although the mapping information list may be generated by mapping a 4-digit passcode to right, left, up and down, the digits of the 4-digit passcode may be mapped all to right, or two digits of the 4-digit passcode to right and the other two digits to up.

Meanwhile, the controller 120 of the mobile device may control execution of a control command corresponding to voice command recognized by the voice recognition module for an object displayed in an input direction of an audio signal containing the voice command, recognized by the direction recognition module.

The object may be executable, playable, or displayable in the mobile device. The object may represent content such as a file, a folder, an icon, a widget, a photo, or a video. The control command corresponding to the recognized voice command may include at least one of a copy, delete, enlarge, contract, send, or shared command for the object.

Figure 9:
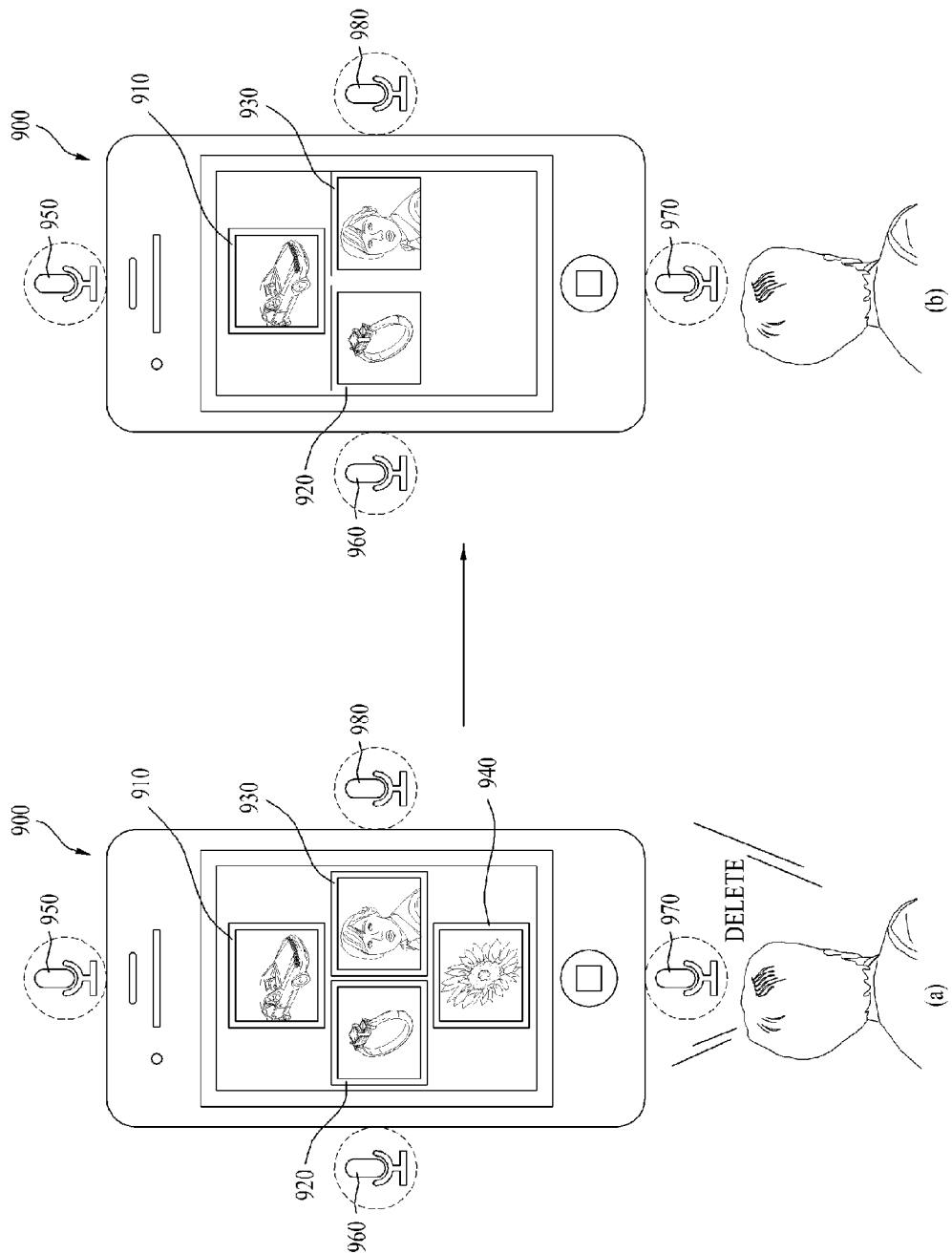
FIG. 9 illustrates an operation for controlling an object based on the input direction of an audio signal and voice command contained in the audio signal in the mobile device according to an embodiment of the present invention.

FIG. 9 illustrates an operation for controlling an object based on the input direction of an audio signal and voice command contained in the audio signal in the mobile device according to an embodiment of the present invention. In the illustrated case of FIG. 9, four photo objects 910, 940, 930 and 920 are arranged respectively at upper, lower, left and right positions of a screen in a mobile device 900 and four microphone sensors 950, 970, 980, and 960 are built in at upper, lower, left and right positions in correspondence with the displayed directions of the photo objects 910, 940, 930 and 920.

When a user speaks a control command (e.g. "Delete) from down the mobile device 900 as illustrated in FIG. 9(a), the mobile device 900 may delete the photo content displayed at the lower direction in response to the control command. Accordingly, the lower photo object 940 is deleted and only the remaining photo objects 910, 920 and 930 are displayed in FIG. 9(b).

Figure 10:
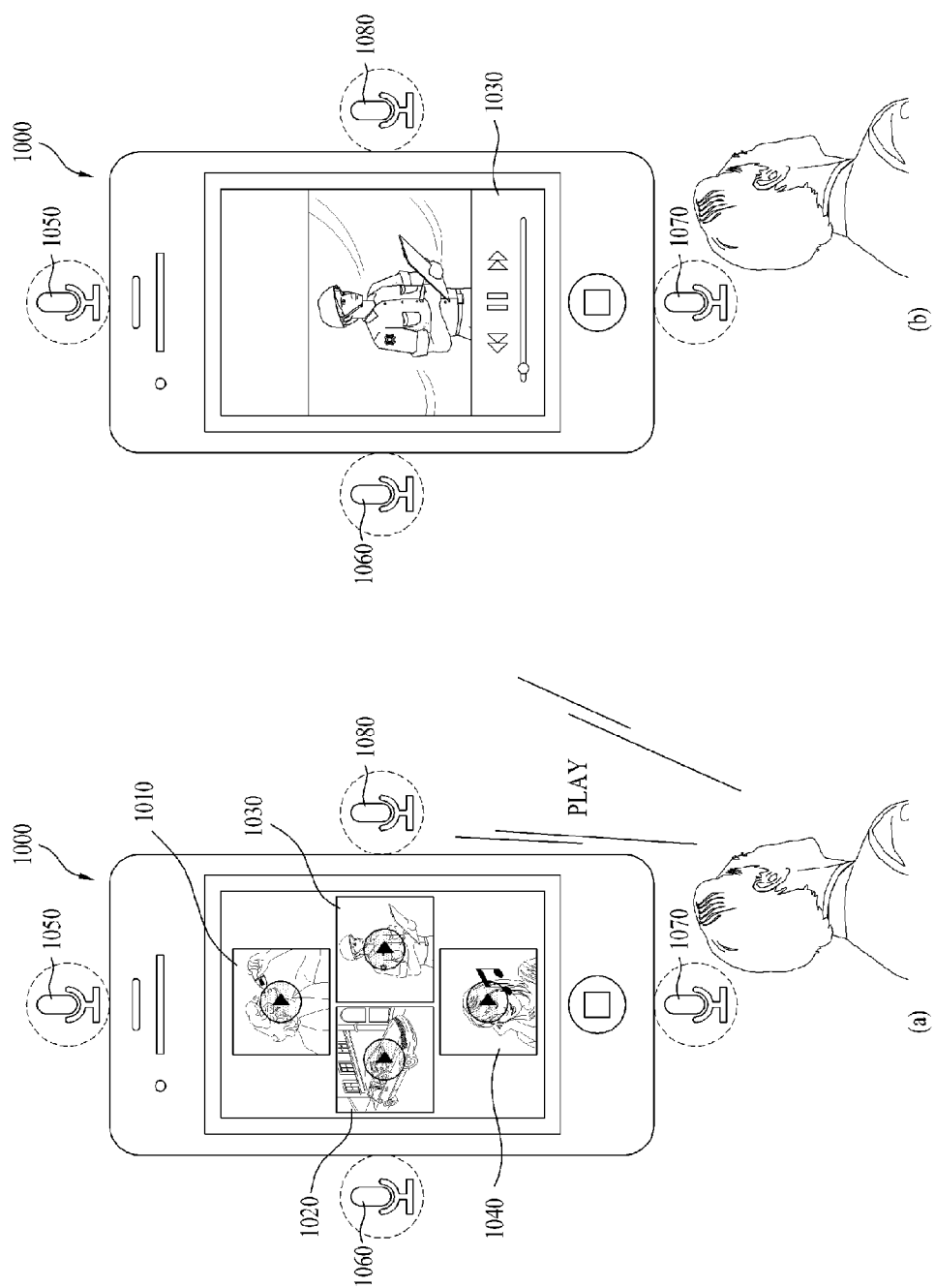
FIG. 10 illustrates an operation for controlling an object based on the input direction of an audio signal and voice command contained in the audio signal in the mobile device according to another embodiment of the present invention.

FIG. 10 illustrates an operation for controlling an object based on the input direction of an audio signal and voice command contained in the audio signal in the mobile device according to another embodiment of the present invention. In the illustrated case of FIG. 10, four video objects 1010, 1040, 1030, and 1020 are arranged respectively in upper, lower, left and right directions and microphone sensors 1050, 1070, 1080, and 1060 are also built in respectively in the upper, lower, left and right directions in correspondence with the video objects 1010, 1040, 1030, and 1020 in a mobile device 1000.

When a user speaks a control command (e.g. "Play") from the left with respect to the mobile device 1000 as illustrated in FIG. 10(a), the mobile device 1000 may recognize the uttered direction and voice command of the user and may control play of the video content 1030 displayed in the left direction, that is, at the left side of the mobile device 1000, as illustrated in FIG. 10(b).

Meanwhile, for the same voice command recognized by the voice recognition module, the controller of the mobile device may control execution of different control commands when the same voice command is uttered from different directions, which will be described below with reference to FIGS. 11 to 15.

Figure 11:
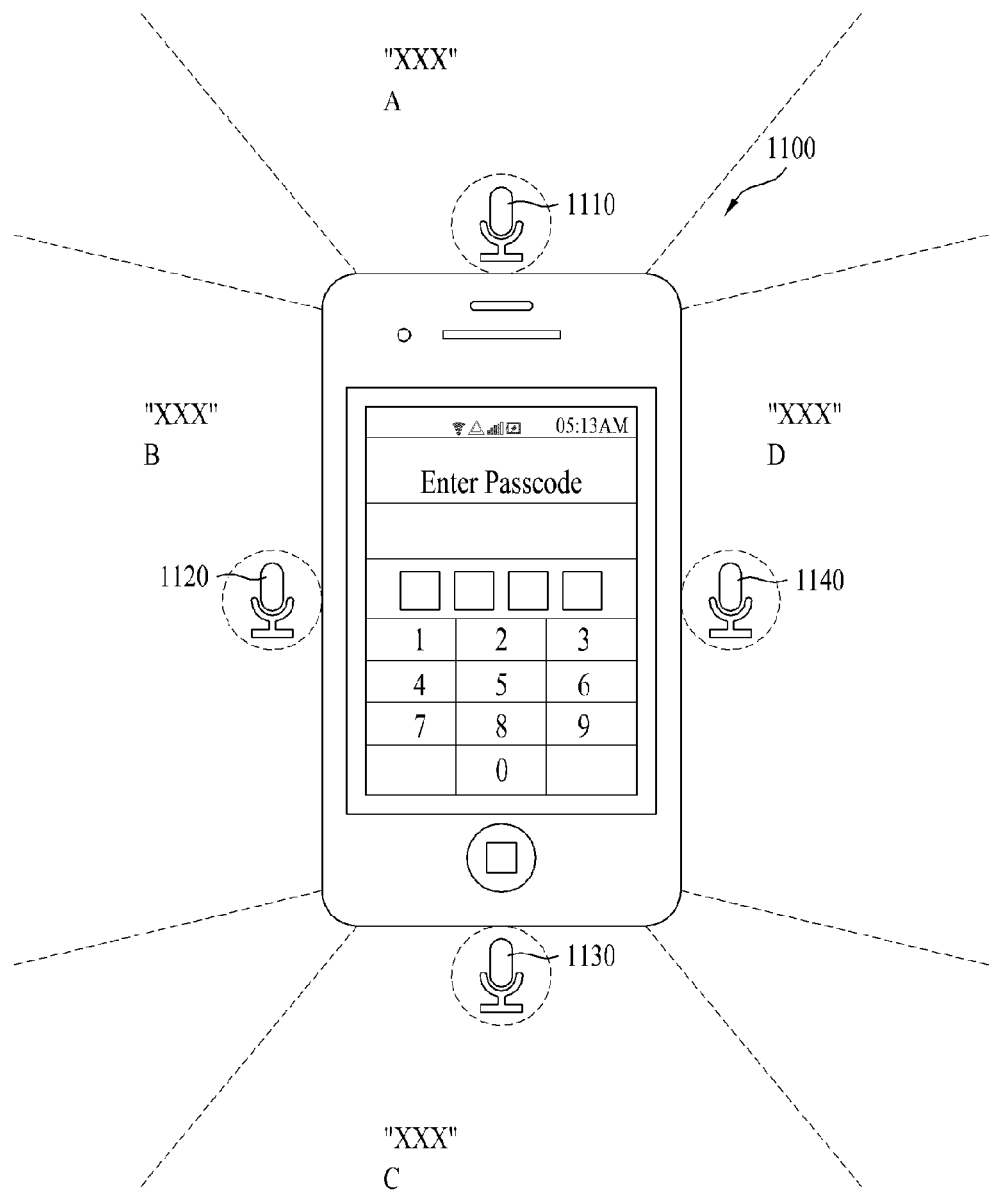
FIG. 11 illustrates directions which are defined in order to control the mobile device to operate differently when the same voice command is uttered from different directions according to an embodiment of the present invention.

FIG. 11 illustrates directions which are defined in order to control the mobile device to operate differently when the same voice command is uttered from different directions according to an embodiment of the present invention.

Referring to FIG. 11, four directions, i.e. up A, down C, left D, and right B may be defined with respect to a mobile device 1100, which should not be construed as limiting the present invention. When needed, more directions or other directions may be defined. In addition, microphone sensors 1110, 1130, 1140, and 1120 are built in respectively in the four directions to thereby increase the accuracy of direction recognition.

In an embodiment of the present invention, for input of the same voice command, a control command corresponding to the voice command may be performed differently according to different directions from which the voice command is uttered in the mobile device. The control command may be a search command, a communication connection command, or an execution command.

When voice command recognized in the voice recognition module corresponds to the search command, the controller of the mobile device may control execution of the search command using different search engine according to a recognized input direction of an audio signal containing the voice command. Specifically, the search command may be executed by different search engine, for example, a different search engine or application according to the tastes of a user or search content. Therefore, content can be searched for immediately using a desired search engine by issuing a voice command from a predetermined direction.

FIG. 12 illustrates an operation for displaying different search engine in the mobile device, when the same voice command is uttered from different directions according to an embodiment of the present invention. When voice command corresponding to the search command is recognized from the direction A in FIG. 11, a preset search engine mapped to the direction A may be displayed as illustrated in FIG. 12(a). If the voice command corresponding to the search command is recognized from the direction C in FIG. 11, a preset search engine mapped to the direction C may be displayed as illustrated in FIG. 12(b). As a consequence, the user can search content conveniently through intended search engine by speaking the same voice command from a direction corresponding to the intended search engine.

In addition, when the user speaks the search command as recognized in the voice recognition module, the controller of the mobile device may control execution of the search command by differentiating categories of search results according to different directions from which the search command is recognized.

Figure 13:
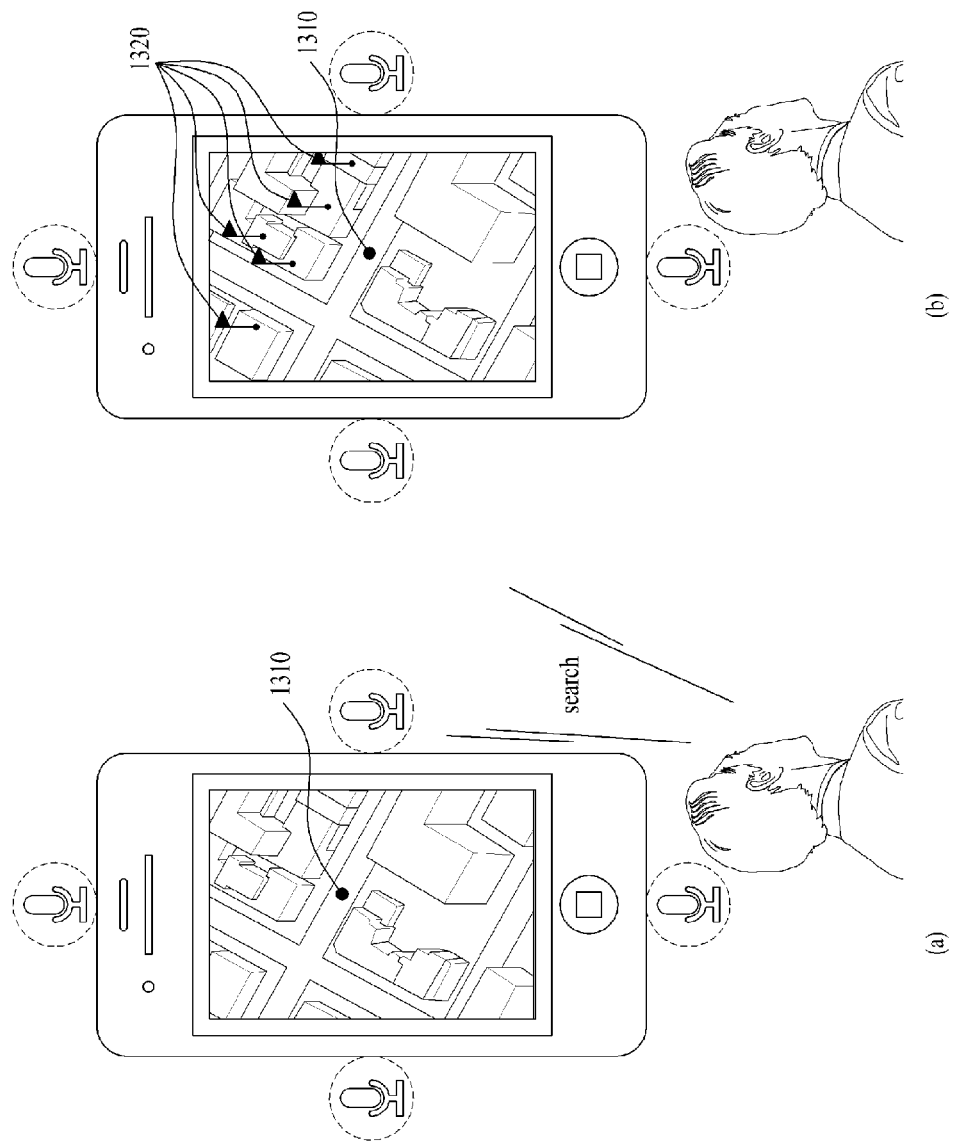
FIG. 13 illustrates an operation for displaying different search results in the mobile device, when the same voice command is recognized from different directions according to an embodiment of the present invention.

FIG. 13 illustrates an operation for displaying different search results in the mobile device, when the same voice command is recognized from different directions according to an embodiment of the present invention.

Referring to FIG. 13(a), a map on which a current user position 1310 is indicated is displayed on the mobile device and a search command ("Search") is recognized from the direction D of FIG. 11. Then, the mobile device recognizes reception of the search command from the direction D of FIG. 11 and thus displays search results 1320 that have been found to the right of the current user position 1310 in FIG. 13(b). As a map search function is performed using a mobile device in this manner, only search results in a specific direction can be displayed according to a direction from which a voice command is recognized.

Compared to the case illustrated in FIG. 13, search results under a different category may be displayed according to a direction from which a voice command is recognized, using a mobile device. For example, if the search command is recognized from the direction A of FIG. 11, restaurant search results may be displayed. If the search command is recognized from the direction B of FIG. 11, bank search results may be displayed. If the search command is recognized from the direction C of FIG. 11, bus stop search results may be displayed. If the search command is recognized from the direction D of FIG. 11, search results about famous restaurants in the neighborhood may be displayed. That is, a user setting of differentiating categories for search results according to different input directions of voice command may be stored in the memory and search results may be displayed according to the user setting.

Figure 14:
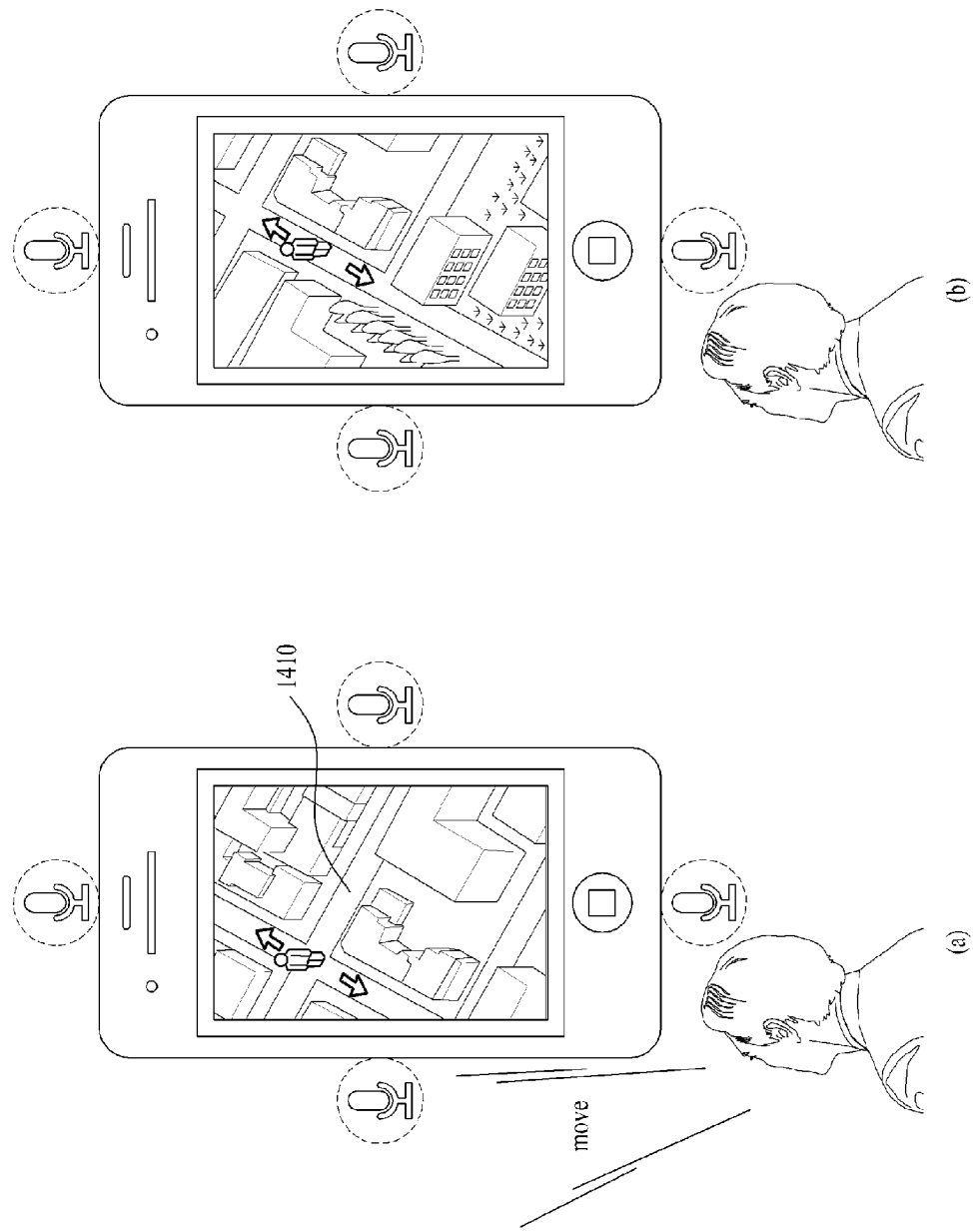
FIG. 14 illustrates an operation for displaying different search results in the mobile device, when the same voice command is recognized from different directions according to another embodiment of the present invention.

FIG. 14 illustrates an operation for displaying different search results in the mobile device, when the same voice command is recognized from different directions according to another embodiment of the present invention. In this embodiment, a user searches for a specific location using a road map.

In FIG. 14(a), when a user searches for a location using a road map, the user is supposed to set a direction at a specific position 1410. Herein, a move command ("Move") is recognized from the direction B of FIG. 11 from the user. Then the mobile device recognizes reception of the move command from the direction B of FIG. 11, searches the left part of the road map with respect to the specific position 1410, and displays search results. If the road map search function is used in the mobile device in this manner, road map search results corresponding to a direction from which a voice command is recognized can be displayed.

In the case where voice command recognized by the voice recognition module corresponds to the communication connection command, the controller of the mobile device may control execution of the communication connection command by differentiating objects to be connected for communication or communication schemes according to different input directions of the same audio signal.

Along with the trend of convergence between a mobile device and other external devices, the mobile device is often used as the remote controller of a TV or a controller for controlling home appliances, when needed. Hence, a mobile device, a home appliance, and a car may be controlled by speaking the same voice command in different directions.

In this manner, a communication connection may be established to different types of external devices according to different directions from which the mobile device receives the communication connection command. For example, when the mobile device receives the communication connection command from the direction A in FIG. 11, the mobile device connects to another nearby mobile device. If the mobile device receives the communication connection command from the direction B in FIG. 11, the mobile device connects to a nearby car by Bluetooth. If the mobile device receives the communication connection command from the direction C in FIG. 11, the mobile device connects to a nearby home appliance. If the mobile device receives the communication connection command from the direction D in FIG. 11, the mobile device connects to a nearby smart TV.

If voice command recognized by the voice recognition module corresponds to the execution command, the controller of the mobile device may control execution of the execution command by differentiating at least one of an execution target, execution means, and a category of execution results according to a recognized input direction of an audio signal containing the voice command in the mobile device.

Figure 15:
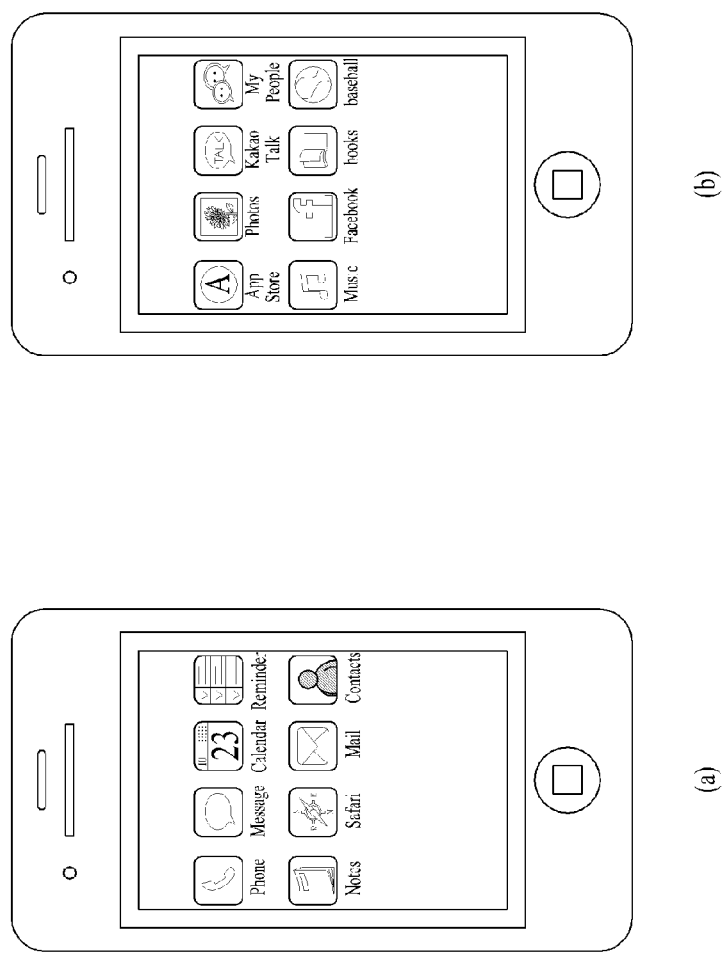
FIG. 15 illustrates an operation for displaying different execution results in the mobile device, when the same voice command is recognized from different directions according to an embodiment of the present invention.

FIG. 15 illustrates an operation for displaying different execution results in the mobile device, when the same voice command is recognized from different directions according to an embodiment of the present invention. As a result of executing the execution command for screen unlocking, a different home screen is displayed on the mobile device according to a different input direction of the execution command.

Referring to FIG. 15(a), when the execution command for screen unlocking is received from the direction B of FIG. 11, a home screen set for business use is displayed. Referring to FIG. 15(b), when the execution command for screen unlocking is received from the direction D of FIG. 11, a home screen set for personal use is displayed.

The above-described function is based on the trend that different applications of a mobile device are used for business use and personal use. This function is useful when different applications or functions are used in the mobile device at different locations.

Similarly, if voice command recognized in the mobile device corresponds to a mail execution command, the mobile device may control execution of a first account mail or a second account mail according to a direction from which an audio signal containing the voice command is recognized. The first account mail may be used for business purposes and the second account mail may be used for personal purposes. When a mail is transmitted or received in the mobile device, a mail application can be executed for a user-intended account according to a direction from which the execution command is recognized in this manner.

If voice command recognized in the mobile device corresponds to a voice execution command, the controller of the mobile device may control output of execution results of the voice execution command in a first category including text or a second category including voice, which will be described later with respect to FIG. 17.

Besides, when a user intends to use an ebook in the mobile device, the contents of the ebook may be displayed in text or read by voice according to a direction from which the execution command is recognized. In this manner, various applications are possible.

It has been described so far that when a recognized input direction of an audio signal and recognized voice command contained in the audio signal match to preset direction-voice mapping information, a control command corresponding to the direction-voice mapping information is executed. On the other hand, the mobile device may need to be controlled differently according to a recognized input direction irrespective of recognized voice command. For example, if a user is to issue a voice command to a mobile device to check a memo or a phone number during a call in progress, generation of a voice command to the same microphone sensor as a microphone sensor of the other party may confuse the other party and the controller of the mobile device may have difficulty in determining which recognized voice command is a voice command or a part of conversation.

Referring to FIG. 16, therefore, the mobile device may be configured such that during a call, it executes a voice command by recognizing the input direction and voice command of an audio signal received only through a built-in upper microphone 1620 of the mobile device, disabling a voice command execution function for a built-in lower microphone 1610 used for the call.

That is, when executing a specific function, the controller may activate only a specific microphone sensor and execute a preset command corresponding to an audio signal received through the enabled microphone sensor. This function is useful especially when the mobile device adopts the voice recognition function. The voice recognition system is application software installed in the mobile device, using a natural language process that enables the mobile device to answer a user's questions, make recommendations, and perform an operation.

Therefore, the mobile device activates only a first microphone sensor used for a call and a second microphone sensor for the voice recognition system. If the second microphone sensor recognizes voice, which means that the voice recognition system is activated, the mobile device deactivates the other microphone sensors including the first microphone sensor. Accordingly, when the user uses the voice recognition system, for example, to search for a phone number during a call, the other sensors except the second microphone sensor are deactivated. As a result, the other party does not hear a voice recognition command and thus is less disturbed.

When a user searches for specific information using the voice recognition system during a call, the mobile device may control the voice recognition system to display search results in text or output the search results by voice. In this case, the user may be prompted to make a choice as to how results of using the voice recognition system are to be used.

Figure 17:
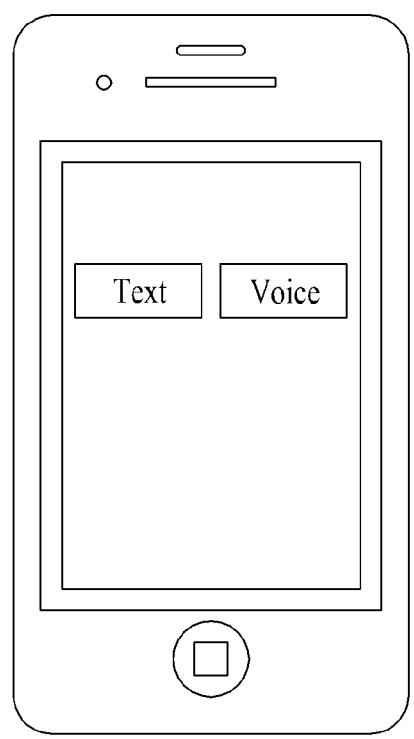
FIG. 17 illustrates an operation for utilizing a voice recognition system in the mobile device according to an embodiment of the present invention.

If the user selects voice output in FIG. 17, the mobile device may control deactivation of all other microphone sensors except the second microphone sensor. Therefore, even though search results are output by voice, the other party cannot hear the search results, thus being less disturbed.

Figure 18:
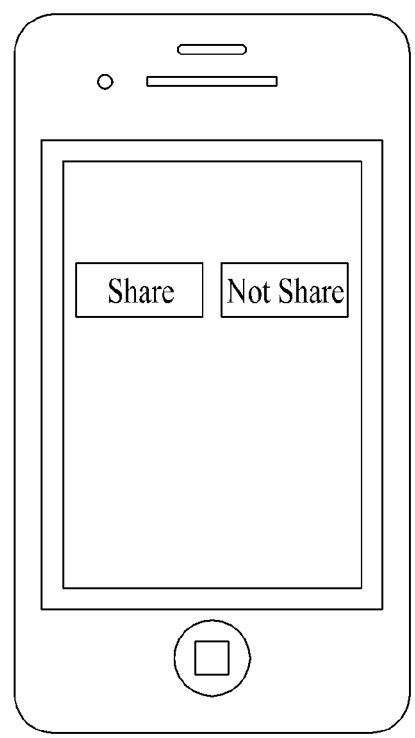
FIG. 18 illustrates an operation for utilizing the voice recognition system in the mobile device according to another embodiment of the present invention.

In some cases, it may be necessary to share the search results with the other party during the call. Then, the user may select Share or Not Share for sharing or not sharing the results of using the voice recognition system with the other party as illustrated in FIG. 18. Upon user selection of Share, the mobile device may activate the first microphone sensor so that the other party may hear the results by voice.

As described above, when the mobile device uses a voice recognition system, the mobile device may activate only a specific microphone sensor used for the voice recognition system, while deactivating the other microphone sensors. The mobile device may also change microphones to be activated and deactivated for the voice recognition system according to user selection.

Figure 19:
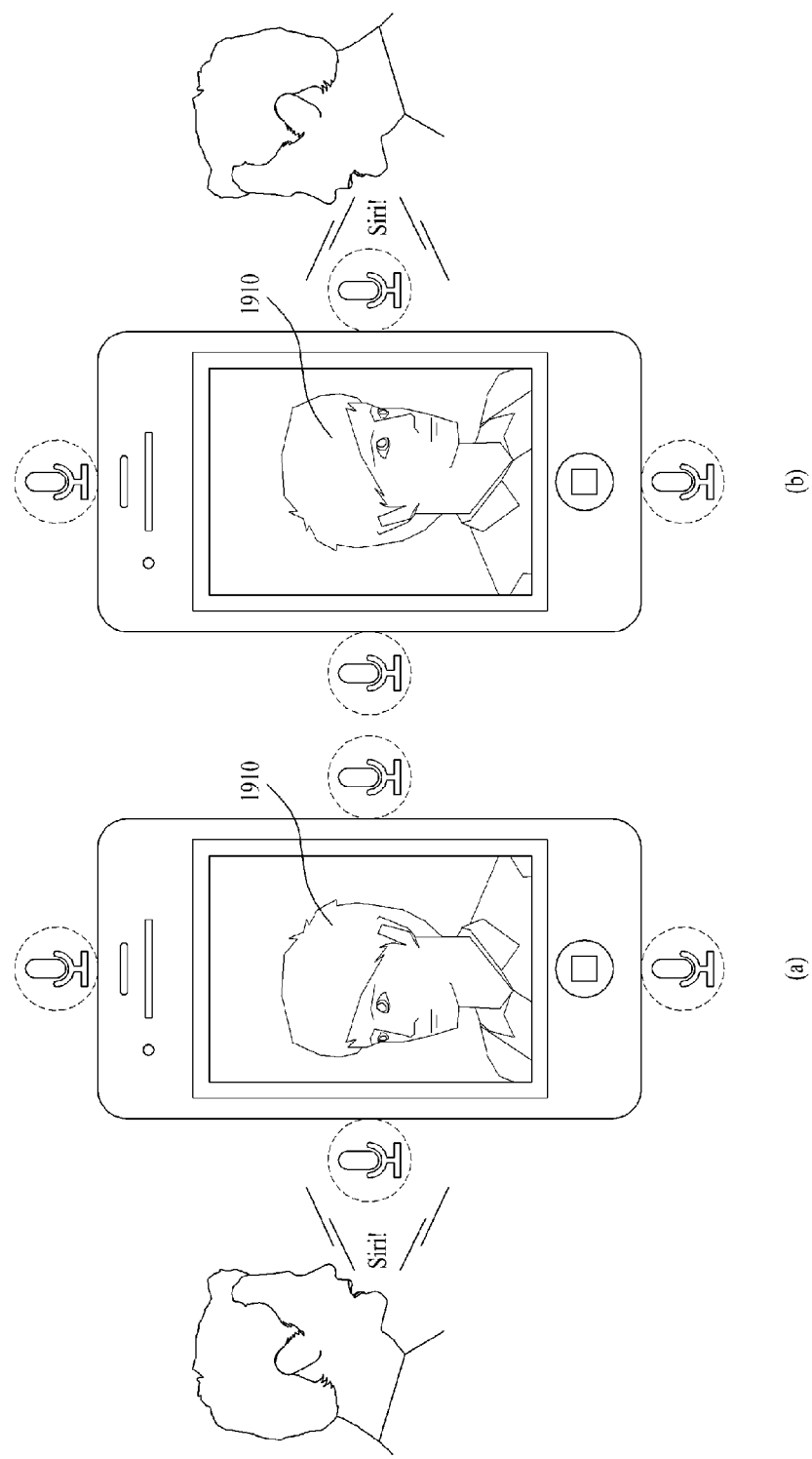
FIG. 19 illustrates an operation for utilizing the voice recognition system in the mobile device according to a further embodiment of the present invention.

In the process where the voice recognition system answers a user's question, recommends to a user, and performs an operation, an avatar representing the voice recognition system may be displayed on the mobile device. As illustrated in FIG. 19, the mobile device may control an avatar 1910 to respond in a direction from which a voice command for activating the voice recognition system is received. That is, upon sensing a command to activate the voice recognition system from the direction B of FIG. 11, the mobile device may display the avatar 1910 facing in the direction B of FIG. 11 as illustrated in FIG. 19(a). As illustrated in FIG. 19(b), when the command to activate the voice recognition system is recognized from the user from the direction D of FIG. 11, the avatar 1910 may be displayed, facing in the direction D of FIG. 11.

If the mobile device is controlled so that an avatar representing a voice recognition system responds according to a direction from which a command to activate the voice recognition system is recognized as described above, the user may feel the voice recognition system more friendly and the voice recognition system may be utilized more.

Figure 20:
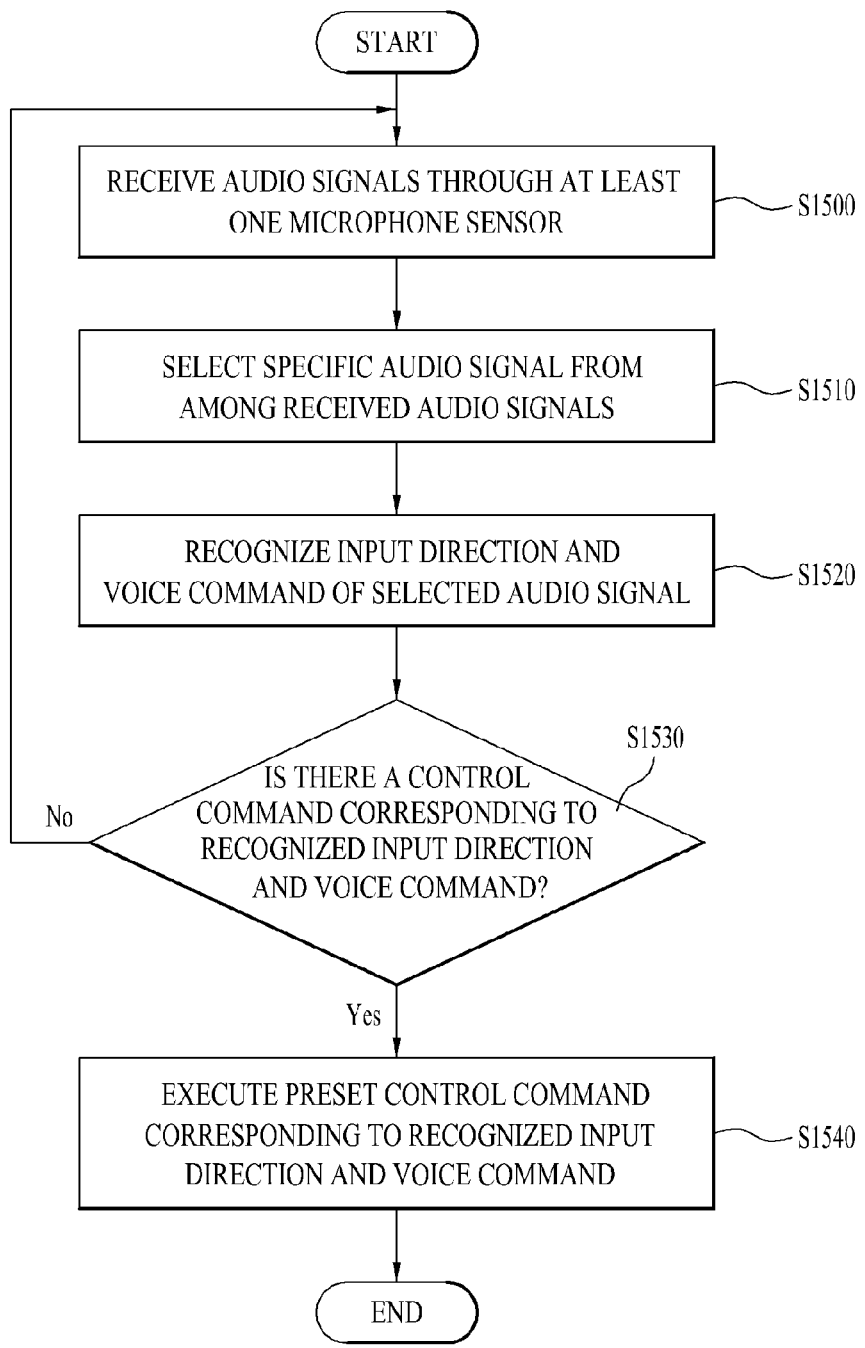
FIG. 20 is a flowchart illustrating a method for controlling the mobile device according to an embodiment of the present invention.

FIG. 20 is a flowchart illustrating a method for controlling the mobile device according to an embodiment of the present invention. With reference to FIG. 20, the method for controlling a mobile device with at least one microphone sensor will be described below.

Referring to FIG. 20, audio signals are received through at least one microphone sensor (S1500). The microphone sensor senses sound around the mobile device and may include any sound sensing means. As described before with reference to FIG. 3, the microphone sensor may include an amplifier for amplifying an input sound to a predetermined level and an A/D converter for converting an input analog audio signal to a digital audio signal.

A specific audio signal is selected from the received audio signals (S1510) and the input direction and voice command of the audio signal are recognized (S1520). When a plurality of audio signals are received, a specific audio signal having a highest sound pressure may be selected by comparing the received audio signals. Sound pressure is a variation in pressure caused by a sound wave and it can be determined that a user has spoken from a direction in which a microphone sensor receiving the audio signal having the highest sound pressure is positioned. Therefore, the direction in which the microphone sensor receiving the audio signal having the highest sound pressure is positioned may be recognized as the input direction of the audio signal and the voice command contained in the audio signal may be recognized by a known voice recognition module.

It is determined whether there is any control command corresponding to the recognized input direction and voice command of the audio signal (S1530). As described before with reference to FIGS. 4 and 6, direction-voice mapping information and control commands for controlling the mobile device according to the direction-voice mapping information may be stored in the memory. Accordingly, the controller of the mobile device may determine whether there is direction-voice mapping information that matches to the recognized input direction and voice command of the audio signal, referring to the memory.

If there is an control command corresponding to the recognized input direction and voice command of the audio signal, the control command is executed. (S1540).

As described before with reference to FIGS. 7 and 8, if at least two audio signals are received successively, it is first determined whether they have been received within a predetermined time. If they have been received within the predetermined time, the input directions and voice command of the audio signals are sequentially recognized. The operation of determining whether the recognized direction and speech of an audio signal matches to preset direction-voice mapping information is performed sequentially for the received two audio signals. If there is direction-voice mapping information matching to the recognized directions and voice command of the audio signals, a preset control command is performed.

Use of the above method regarding a screen unlocking command or a command to unlock an application installed in the mobile device can increase security simply.

As described before with reference to FIGS. 9 and 10, a control command corresponding to the recognized voice command is performed for an object displayed in the recognized input direction of the audio signal in the preset control command execution step. The object is executable, playable, or displayable in the mobile device, including content such as a file, an icon, an application, a widget, a photo, or a video.

When a command such as delete, copy, enlarge, contract, send, share, etc. is to be issued for a specific object displayed on the mobile device, the specific object may be selected by speaking a voice command in a predetermined direction without directly selecting the object and thus the control command may be executed for the object.

As described before with reference to FIGS. 11, 12 and 13, for the recognized same voice command, a different control command is performed according to the recognized input direction of the audio signal in the preset control command execution step.

For example, even though a user speaks the same search command, different means may be used or search results of a different category may be displayed according to the recognized input direction of the audio signal. Therefore, if the user maps favorite search engines to directions and speaks a search command from a direction corresponding to an intended search engine, the mobile device performs a search using the intended search engine.

For the same communication connection command spoken by a user, different communication objects may be connected or different communication schemes may be used according to different input directions of an audio signal. Accordingly, if the user maps favorite communication schemes such as Zigbee, Bluetooth, direct Wireless Fidelity (WiFi), etc. to directions and speaks the communication connection command, the mobile device automatically connects to an external device capable of conducting communication in a communication scheme mapped to a direction from which the communication connection command is spoken.

Figure 21:
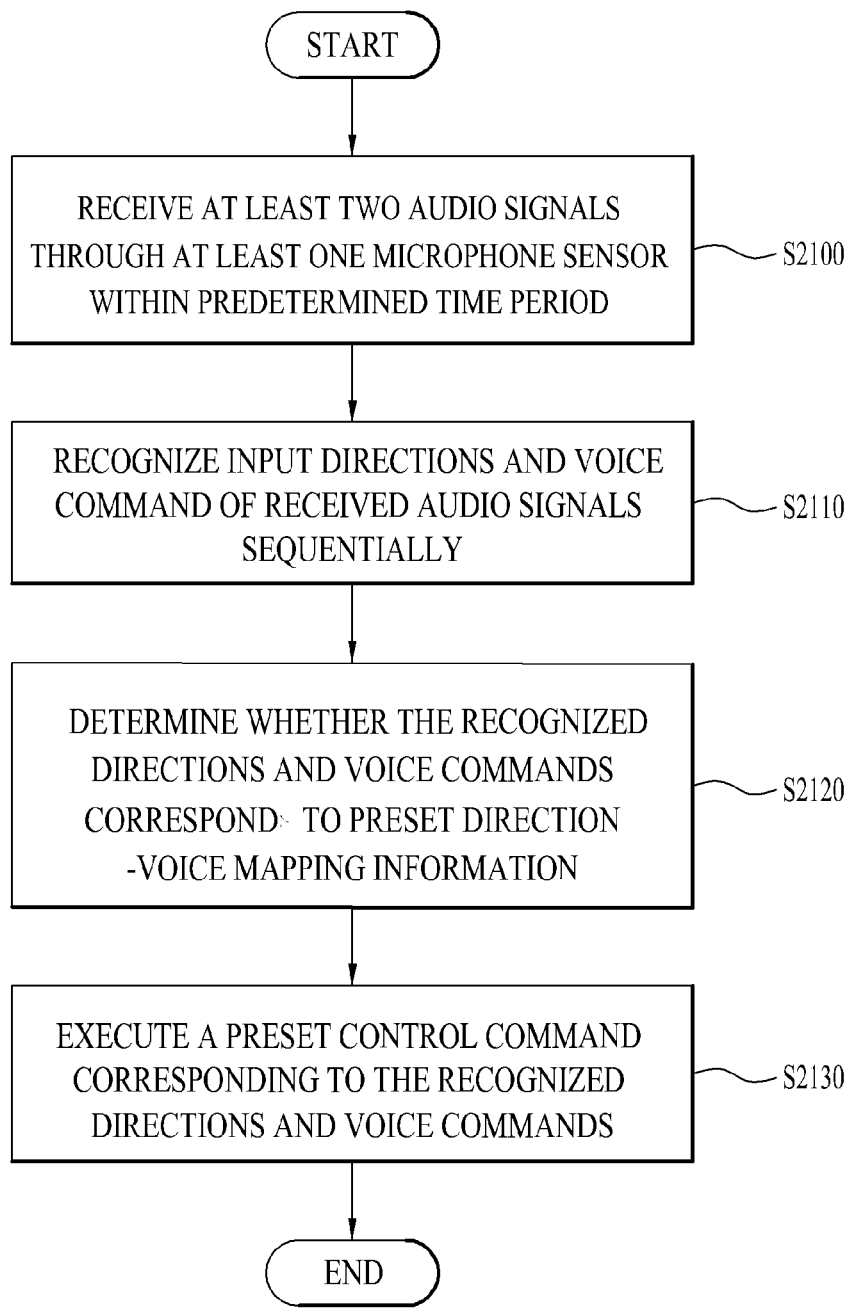
FIG. 21 is a flowchart illustrating a method for controlling the mobile device according to another embodiment of the present invention.

FIG. 21 is a flowchart illustrating a method for controlling the mobile device according to another embodiment of the present invention.

Referring to FIG. 21, at least two audio signals are received through at least one microphone sensor within a predetermined time period (S2100). The microphone sensor is used to sense sound around the mobile device, including any means for sensing sound.

Input directions and voice command are recognized from the at least two audio signals sequentially (S2110).

If the microphone sensor is directional, the input direction of an audio signal may be sensed through the microphone sensor. Otherwise, an audio signal having a highest sound pressure may be selected from simultaneously received audio signals by comparing the received audio signals. Thus, the direction in which a microphone sensor that has received the audio signal having the highest sound pressure is disposed may be determined to the input direction of the audio signal.

Voice command contained in an audio signal may be recognized by a known voice recognition module (or voice recognition engine). The voice recognition module may recognize voice, that is, a specific physical sound uttered by human vocal organs from an audio signal and thus may determine the meaning of the voice command or identify who has uttered the voice command.

If an input direction and voice command mapped to the input direction is referred to as direction-voice mapping information, two pieces of direction-voice mapping information may be generated when input directions and voice command are recognized from at least two audio signals sequentially and the sequentially recognized direction-voice mapping information is considered as one group called a mapping information list.

A decision is made for the at least two audio signals sequentially as to whether the recognized directions and voice command matches to preset direction-voice mapping information (S2120). That is, as described before with reference to FIGS. 4 and 6, the mapping information list of the sequentially received at least two audio signals is compared with a mapping information list pre-stored in the memory.

If the former mapping information list matches to the latter mapping information list, a preset control command is executed (S2130). The preset control command may include a screen unlocking command or an application unlocking command for the mobile device, as described before with reference to FIGS. 7 and 8.

Figure 22:
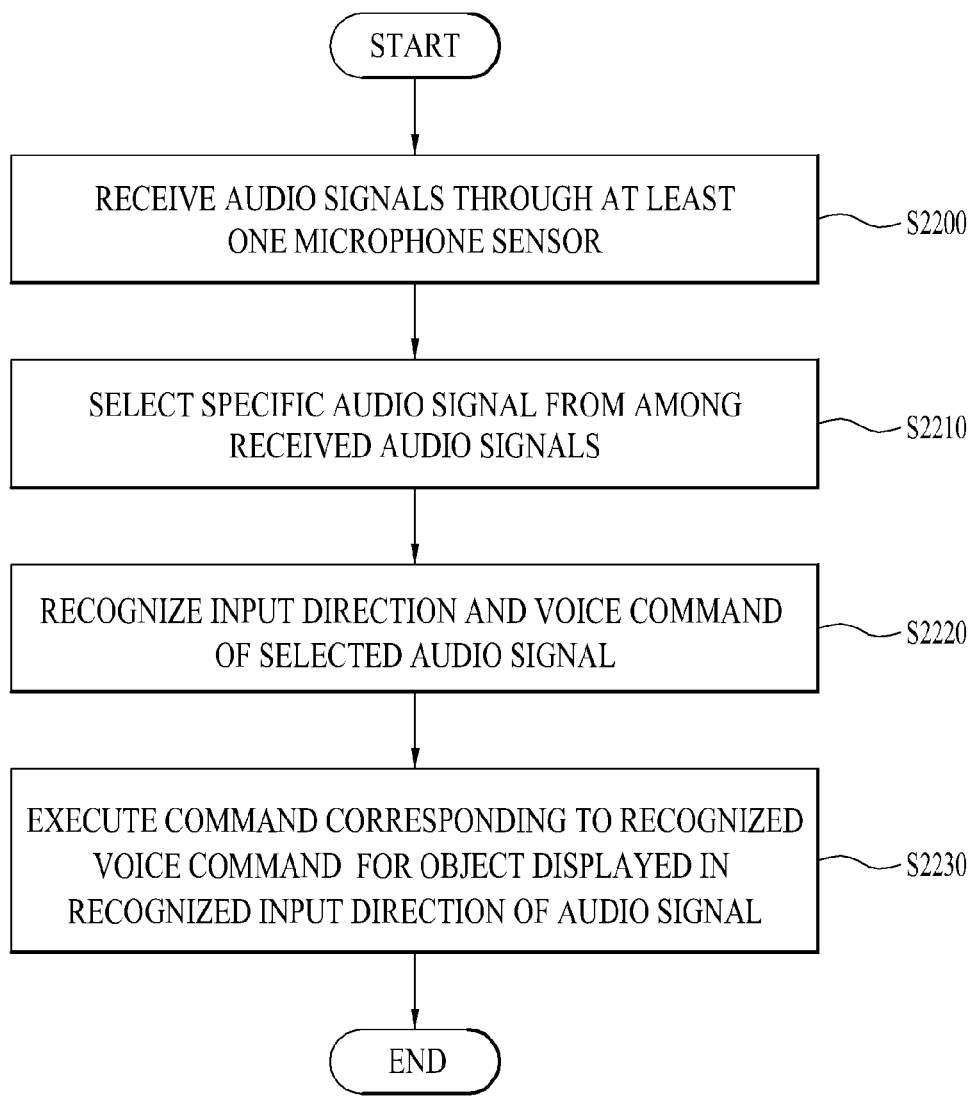
FIG. 22 is a flowchart illustrating a method for controlling the mobile device according to a further embodiment of the present invention.

FIG. 22 is a flowchart illustrating a method for controlling the mobile device according to a further embodiment of the present invention.

Referring to FIG. 22, audio signals are received through at least one microphone sensor (S2200). The microphone sensor senses sound around the mobile device and may include any sound sensing means. As described before with reference to FIG. 3, the microphone sensor may include an amplifier for amplifying an input sound to a predetermined level and an A/D converter for converting an input analog audio signal to a digital audio signal.

A specific audio signal is selected from the received audio signals (S2210). When a plurality of audio signals are received as described before with reference to FIG. 20, a specific audio signal having a highest sound pressure may be selected by comparing the received audio signals.

The input direction and voice command of the selected audio signal are recognized (S2220). The direction in which the microphone sensor receiving the audio signal having the highest sound pressure is positioned may be recognized as the input direction of the audio signal and the voice command contained in the audio signal may be recognized in the same manner as described before with reference to FIG. 21.

A control command corresponding to the recognized voice command is performed for an object displayed in the recognized input direction of the audio signal (S2230). The object is executable, playable, or displayable in the mobile device, including content such as a file, an icon, an application, a widget, a photo, or a video.

As described before with reference to FIGS. 9 and 10, when a control command such as delete, copy, enlarge, contract, send, share, etc. is to be issued for the object displayed on the mobile device, the object may be selected by speaking a voice command in a predetermined direction without directly selecting the object and thus the control command may be executed for the object.

In addition, when a control command such as delete, copy, enlarge, contract, send, share, etc. is to be issued for the object displayed on the mobile device, the control command may be performed differently according to the recognized input direction of the control command even though the same voice command is uttered.

For example, for the same share command, content may be shared to a personal account mail or a business account mail according to the recognized input direction of the voice command of the share command. Similarly, for the same send command, data may be sent in text, by mail, or in a video according to the recognized input direction of the voice command of the send command.

As is apparent from the above description, a voice recognition-based operation is performed, taking into account a direction from which a sound source is recognized as well as voice command contained in the sound source, recognized through at least one microphone sensor. Therefore, security can be increased.

Even though the same voice command is spoken, the control command can be performed differently according to the recognized input direction of the voice command. Accordingly, various functions of a mobile device can be used simply and thus user convenience is increased.

Since one or more microphone sensors are disposed at various positions in a mobile device, the voice recognition errors of the mobile device can be reduced.

While the drawings have been described separately for convenience' sake of description, the embodiments described in the drawings may be combined into a new embodiment. When needed to those skilled in the art, designing a computer-readable recording medium to which a program for implementing the foregoing embodiments of the present invention is recorded falls within the appended claims of the present invention.

The mobile device and the method for controlling the same according to the present invention are not limited to the above-described embodiments of the present invention. Rather, the embodiments of the present invention may be wholly or partially combined so as to make variations to the present invention.

The method for controlling a mobile device according to the present invention may be implemented as processor-readable code that can be written to a recording medium readable by a processor included in a network device. The processor-readable recording medium includes any type of recording device in which processor-readable data is stored. Examples of the processor-readable recording medium include a ROM, a RAM, a CD-ROM, a magnetic tape, a floppy disk, an optical data storage device, and a carrier wave (e.g. data transmission over the Internet). The processor-readable recording medium can be distributed over a plurality of computer systems connected to a network so that processor-readable code is written thereto and executed therefrom in a decentralized manner.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for controlling a mobile device having at least one microphone sensor, the method comprising:
   receiving an audio signal through the at least one microphone sensor;
   recognizing an input direction and a voice command of the audio signal;
   determining whether the recognized input direction and the recognized voice command correspond with a preset input direction and a preset voice command mapped to the preset input direction; and
   executing, by the mobile device, at least one preset control command, when the recognized input direction and the recognized voice command are determined to correspond with the preset input direction and the preset voice command,
   wherein a preset control command corresponding to the recognized voice command is executed differently depending on the recognized input direction of the audio signal, even though a same voice command is recognized.

2. The method according to claim 1, further comprising:
   executing a control command for unlocking a screen of the mobile device.

3. The method according to claim 1, further comprising:
   executing a control command for unlocking an application installed in the mobile device.

4. A mobile device comprising:
   a microphone unit including at least one microphone sensor configured to receive an audio signal;
   a memory configured to store a preset control command corresponding to an input direction of the audio signal; and
   a controller configured to recognize an input direction and a voice command of the received audio signal, and to control the mobile device to execute at least one preset control command corresponding to the recognized input direction and the recognized voice command,
   wherein a control command corresponding to the recognized voice command is executed differently by the mobile device depending on the recognized input direction of the audio signal, even though a same voice command is recognized.

5. The mobile device according to claim 4, wherein when the control command corresponding to the recognized voice command is a search command, the controller controls execution of the search command by using a different search engine or by displaying a different category of search results depending on the recognized input direction of the audio signal.

6. The mobile device according to claim 4, wherein when the control command corresponding to the recognized voice command is a communication connection command, the controller controls execution of the communication connection command by using a different communication target or a different communication scheme depending on the recognized input direction of the audio signal.

7. The mobile device according to claim 4, wherein when the control command corresponding to the recognized voice command is an execution command, the controller controls execution of the execution command by using at least one of a different execution target, a different execution unit, and a different category of execution results depending on the recognized input direction of the audio signal.

8. The mobile device according to claim 4, wherein when the control command corresponding to the recognized voice command is an electronic mail execution command, the controller selectively controls execution of either a first account's electronic mail or a second account's electronic mail depending on the recognized input direction of the audio signal.

9. The mobile device according to claim 4, wherein when the control command corresponding to the recognized voice command is a voice execution command, the controller selectively controls output of a result of executing the voice execution command either in a first category including text or a second category including voice, depending on the recognized input direction of the audio signal.

10. The mobile device according to claim 4, wherein the memory is further configured to store direction-voice mapping information including information about input directions of audio signals and voice commands mapped to the input directions, and to store control commands corresponding to the direction-voice mapping information for controlling the mobile device.

11. The mobile device according to claim 10, wherein the memory is further configured to store a mapping information list for at least two audio signals successively received within a predetermined time period and a control command corresponding to the mapping information list to control the mobile device.

12. The mobile device according to claim 11, wherein when an order and content of direction-voice mapping information recognized from the at least two audio signals match with the mapping information list stored in the memory, the controller controls execution of the control command corresponding to the mapping information list.

13. The mobile device according to claim 12, wherein the control command corresponding to the mapping information list includes a command for unlocking a screen of the mobile device.

14. The mobile device according to claim 12, wherein the control command corresponding to the mapping information list includes a command for unlocking an application installed in the mobile device.

15. A non-transitory computer-readable medium storing therein a computer program which is executable by a processor and implements the method of claim 1.

16. A mobile device comprising:
   a plurality of microphones configured to sense a sound generated by a user of the mobile device who desires to execute a function of the mobile device,
   wherein the microphones are arranged in the mobile device to sense the sound from at least two different directions;
   a memory configured to store a preset control command corresponding to an input direction of the sound; and
   a controller configured to recognize the sound and the input direction of the sound, and to control the mobile device to execute the preset control command corresponding to the recognized sound and the recognized input direction,
   wherein the controller executes a preset control command differently depending on the recognized input direction of the sound even though a substantially same sound is recognized.

17. A method for controlling a mobile device having a plurality of microphones, the method comprising:

sensing, by the plurality of microphones, a sound generated by a user of the mobile device who desires to execute a function of the mobile device,
wherein the plurality of microphones is arranged in the mobile device to sense the sound from at least two different directions;
recognizing the sound and the input direction of the sound; and
controlling the mobile device to execute a preset control command corresponding to the recognized sound and the recognized input direction,
wherein a preset control command is executed differently depending on the recognized input direction of the sound, even though a substantially same sound is recognized.

18. A non-transitory computer-readable medium storing therein a computer program which is executable by a processor and implements a method for controlling a mobile device having a plurality of microphones, the method comprising:
sensing, by the plurality of microphones, a sound generated by a user of the mobile device who desires to execute a function of the mobile device,
wherein the of microphones is arranged in the mobile device to sense the sound from at least two different directions;
recognizing the sound and the input direction of the sound; and
controlling the mobile device to execute a preset control command corresponding to the recognized sound and the recognized input direction,
wherein a preset control command is executed differently depending on the recognized input direction of the sound, even though a substantially same sound is recognized.

* * * * *